SEPARATION OF INDIVIDUAL WAFERS OF A SEMICONDUCTOR DISC

Filed Nov. 22, 1966 5 Sheets-Sheet 1

INVENTOR
Johannes Lotz

BY Spencer & Kaye
ATTORNEYS

INVENTOR
Johannes Lotz

BY Spencer & Kaye
ATTORNEYS

INVENTOR
Johannes Lotz

BY Spencer & Kaye
ATTORNEYS

INVENTOR
Johannes Lotz
BY Spencer & Kaye
ATTORNEYS

Aug. 19, 1969 J. LOTZ 3,461,537

SEPARATION OF INDIVIDUAL WAFERS OF A SEMICONDUCTOR DISC

Filed Nov. 22, 1966 5 Sheets-Sheet 5

INVENTOR
Johannes Lotz

BY Spencer & Kaye
ATTORNEYS

Patented Aug. 19, 1969

3,461,537

United States Patent Office 3,461,537

SEPARATION OF INDIVIDUAL WAFERS OF A SEMICONDUCTOR DISC

Johannes Lotz, Heilbronn, Germany, assignor to Telefunken Patentverwertungsgesellschaft m.b.H., Ulm (Danube), Germany Filed Nov. 22, 1966, Ser. No. 596,117
Claims priority, application Germany, Nov. 23, 1965, T 29,823
Int. Cl. B23p *17/00;* B65b *31/00, 63/00*
U.S. Cl. 29—413 9 Claims

ABSTRACT OF THE DISCLOSURE

There is disclosed herein a method for separating a semiconductor disc into individual wafers by scoring the disc and breaking it along the scoring lines while maintaining the wafers in their respective relative positions adjacent to each other.

The present invention relates to the fabrication of semiconductor elements, and particularly to the separation of a semiconductor disc, or plate, into individual semiconductor wafers, or chips.

Many processes are known in which a large number of individual semiconductor elements are all fabricated simultaneously on a single relatively large semiconductor plate, or disc. It has been suggested to separate these individual elements from one another, at the end of the fabrication process, by scoring the disc and breaking it along the scoring lines.

Such a method is used, for example, in the fabrication of planar semiconductor elements according to arrangements of the disc technique. In this technique, a large number of planar arrangements are produced simultaneously on a common semiconductor disc which is then scored and broken into individual wafers each containing one semiconductor element or unit. To carry out the scoring, the semiconductor disc is placed, for example, on a strip of transparent adhesive tape or is glued with picein onto a non-adhesive tape.

This known method for scoring and breaking apart a semiconductor disc has the disadvantage that the order in which the semiconductor wafers were originally arranged on the disc is lost after they are broken apart and removed from the adhesive tape or glue surface. An enormous amount of time and labor is then required to separate those wafers which were found defective and marked as rejects, for example with red ink, in tests carried out before the scoring and separating operations and which have become scattered among the 2000 or 3000 semiconductor wafers derived from a single semiconductor disc, all of the wafers being piled in complete disarray after separation from the adhesive tape or glued tape.

When this method is employed, it is also necessary to employ extreme care during sorting to assure that the separated semiconductor wafers are correctly positioned and have their contacting areas directed upwardly since it is of importance that in subsequent operations, such as the welding of the semiconductor wafer onto a housing base for example, the semiconductor wafer be properly oriented.

It is therefore a primary object of the present invention to eliminate the drawbacks inherent in such methods.

A further object of the present invention is to provide a novel method for separating a semiconductor disc into a large number of individual wafers.

Yet a further object of the present invention is to eliminate the need for subsequent sorting operations after a semiconductor disc has been broken up into its individual wafers.

These and other objects according to the present invention are achieved by the provision of a method of separating a semiconductor disc containing a plurality of semiconductor elements into a plurality of individual wafers each containing at least one of the elements, the disc being scored along lines defining the boundaries of the individual wafers. The method according to the present invention is carried out by inserting such scored disc into a flexible, substantially flat encosure and evacuating air from such enclosure, and sealing the evacuated enclousre, for causing the walls of the enclosure to bear firmly against the disc and thus to maintain the wafers in their relative positions when the disc has been subsequently broken apart. Then, according to the present invention, the arrangement is subjected to the operations of breaking the disc apart along its scoring lines for mechanically separating the individual wafers from one another, and removing part of such enclosure for exposing the individual semiconductor wafers while maintaining them in their respective positions.

The disc is preferably broken apart by placing the enclosure on a rubber padding and by passing a roller over the enclosure at least once in a direction perpendicular to each set of scoring lines.

The enclosure is preferably made of a synthetic elastic material, such as polyester, for example, capable of being heat sealed.

Additional objects and advantages of the present invention will become apparent upon consideration of the following description when taken in conjunction with the accompanying drawings in which.

Figure 4:
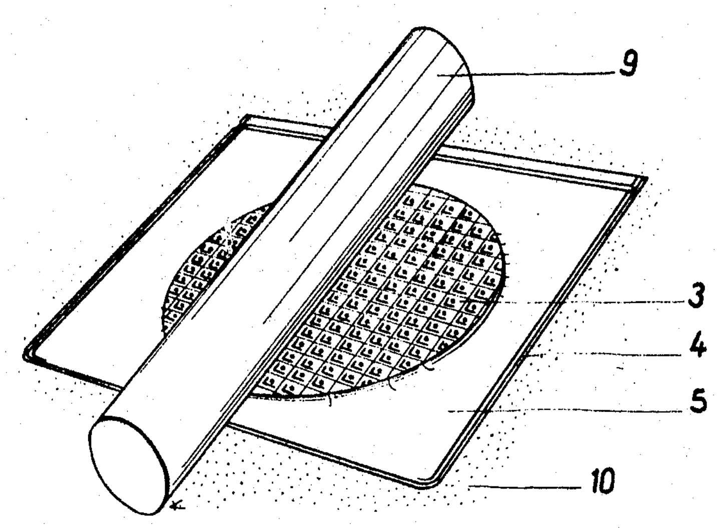
FIGURE 4 is a perspective view illustrating a further step in the process in the present invention.
Figure 4A:
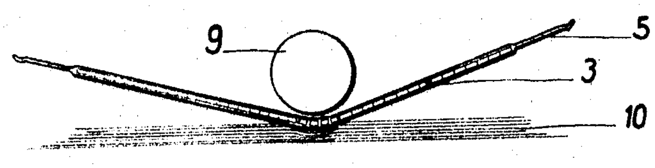

FIGURE 4*a* is an end view of the arrangement shown in FIGURE 4.

Figure 5:
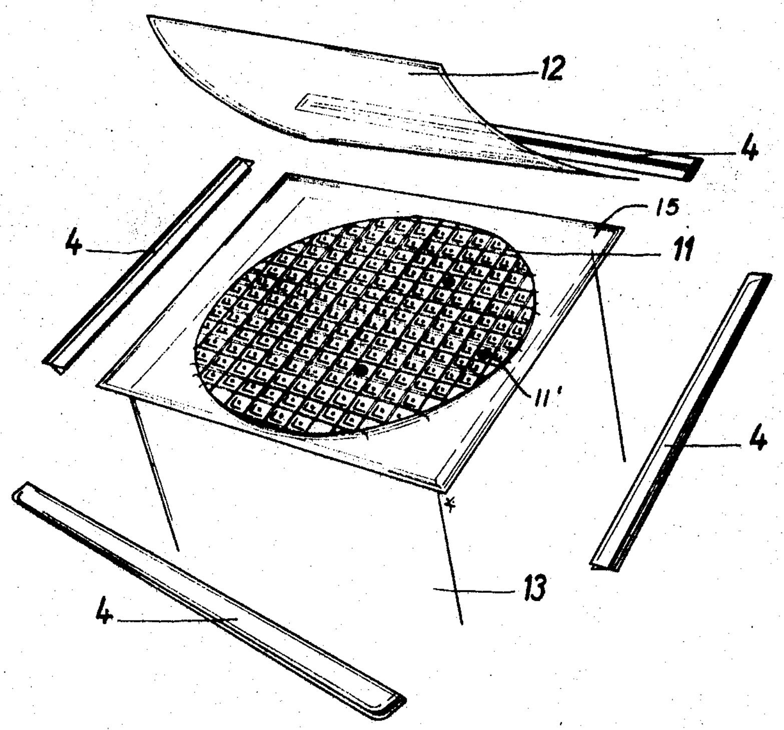

FIGURE 5 is a perspective view illustrating a yet further step in the process of the present invention.

Figure 6:
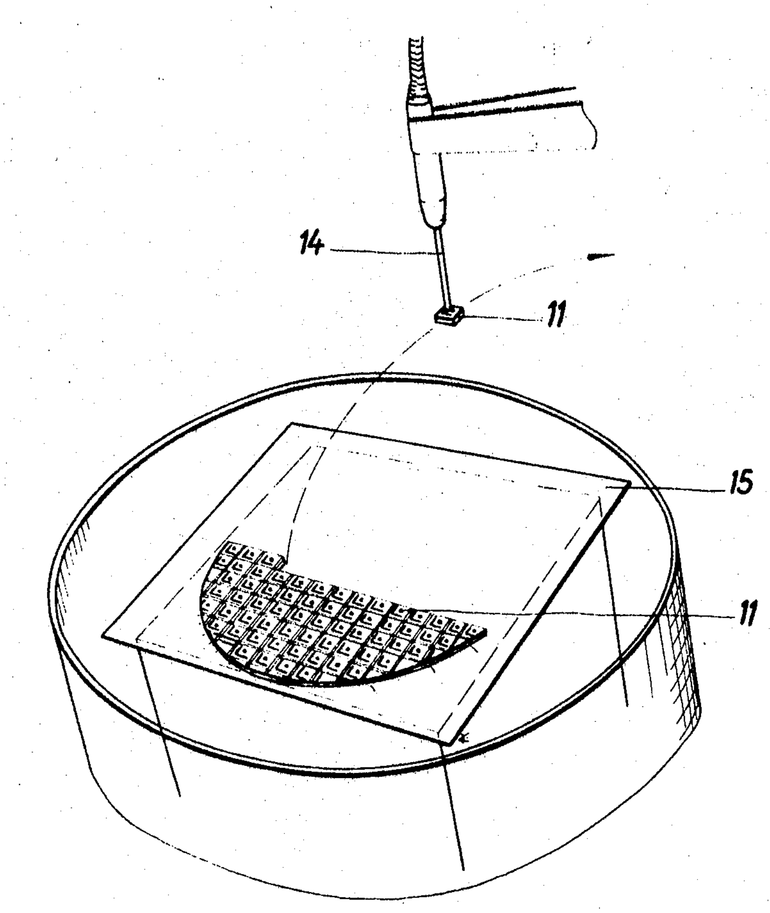

FIGURE 6 is a perspective view illustrating a final step in the process of the present invention.

Figure 1:
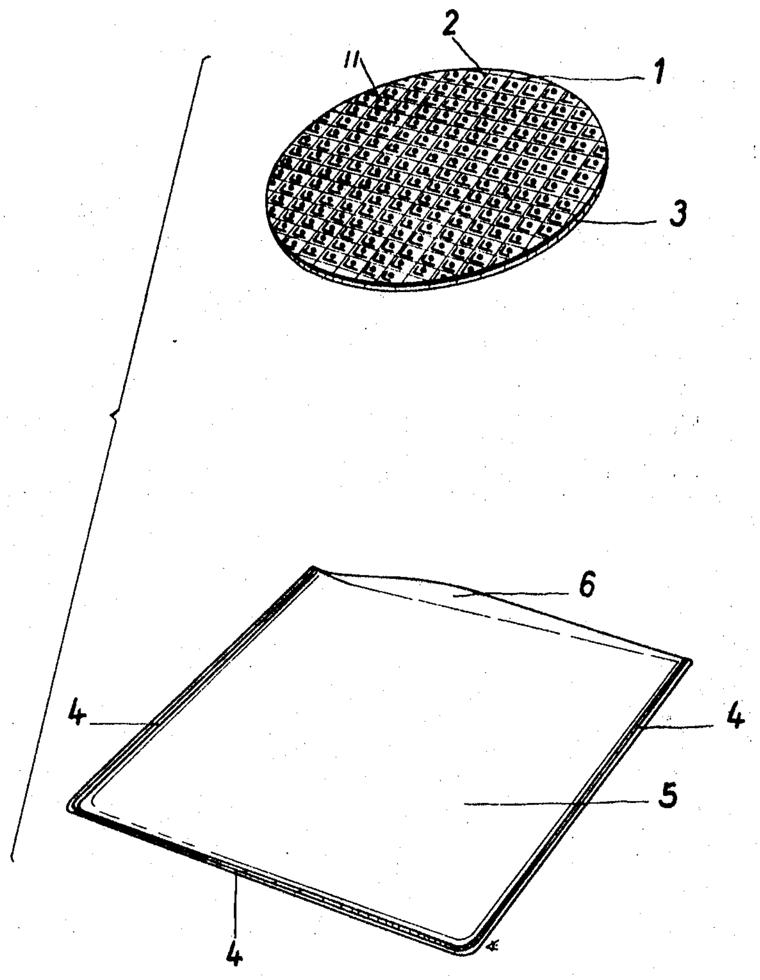
FIGURE 1 is a perspective view illustrating a first stage in the process of the present invention.

Referring first to FIGURE 1, there is shown a semiconductor disc 3 containing a large number of semiconductor elements each disposed on a separate wafer 11 originally constituting an integral part of the disc 3. For separating the wafers from one another, the disc is provided with two mutually perpendicular sets 1 and 2 of scoring lines along which it is to be broken. There is also provided a flexible, transparent enclosure 5, which may be constituted by a plastic such as a polyester which is sealed on three sides by welded seams 4 and which is open along one side 6 to define a pocket. Disc 3 is inserted through the open side 6 into the enclosure 5.

Figure 2:
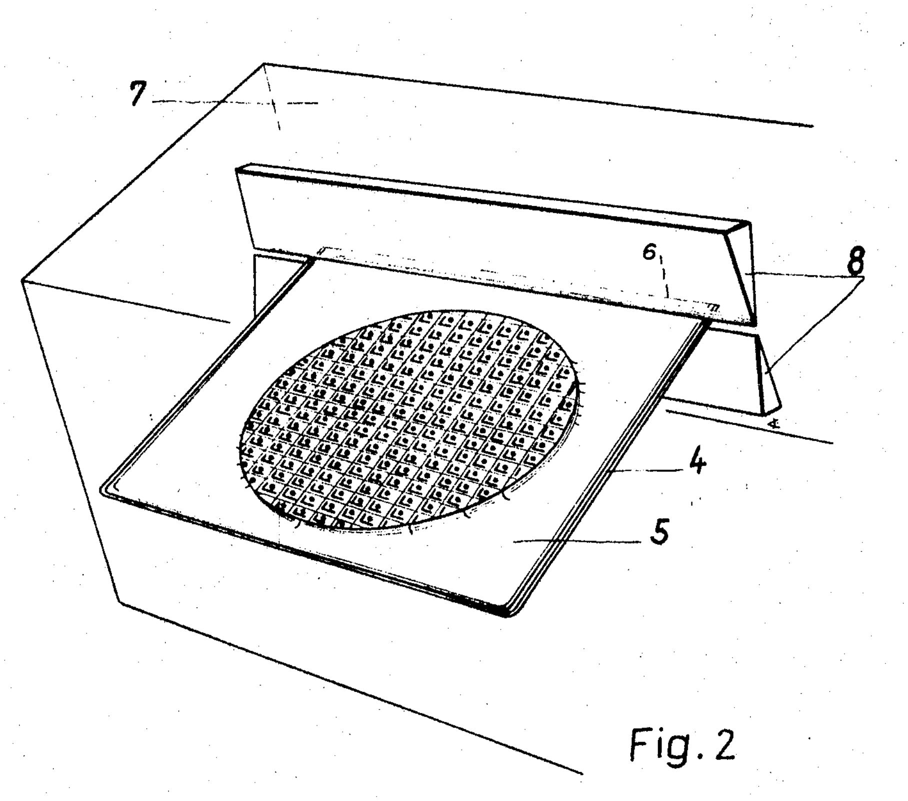
FIGURE 2 is a perspective view illustrating a subsequent stage in the process.
Figure 3:
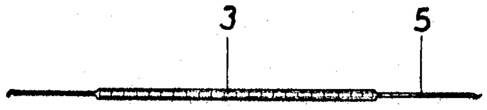
FIGURE 3 is an end view of the arrangement formed by the processed step illustrated in FIGURE 2.

Then, as is shown in FIGURE 2, the open side 6 of enclosure 5 is inserted into a vacuum chamber 7 and between heat sealing electrodes 8. The interior of enclosure 5 is evacuated by chamber 7 and its open end 6 is sealed by heat contact welding or heat impulse welding, for example, by means of electrodes 8, which are disposed within vacuum chamber 7. According to one of the advantageous features of the present invention, the evacuation of enclosure 5 before the sealing of its open side 6 has the effect of causing the flat surfaces of the enclosure 5 to press against both flat surfaces of disc 3 so as to prevent the individual semiconductor wafers from shifting their positions after the wafer has been broken along the scoring lines. The manner in which the enclosure conforms closely to the shape of disc 3 is shown most clearly in the elevational view of FIGURE 3.

Vacuum chambers and heat sealing apparatus of the type which may be used in the practice of the present invention are extremely well-known in the art and hence will not be described in detail herein.

Then, the disc is ready to be broken into individual wafers. One arrangement for carrying out this operation is shown in FIGURES 4 and 4*a*.

As is shown in these figures, the disc 3 may be broken along the scoring lines by placing the evacuated enclosure 5 on a rubber padding 10 and by rolling a roller 9 over the enclosure 5 one or more times in each direction perpendicular to one set of scoring lines. As is shown in an exaggerated manner in FIGURE 4*a*, the provision of the rubber padding 10 permits the pressure of the roller to flex the disc 3 in such a manner as to cause it to break along the scoring lines disposed parallel to the axis of the roller 9.

Then, as is illustrated in FIGURE 5, in order to expose the individual semiconductor wafers 11, the seams 4 of the enclosure are cut away and the top surface 12 of the enclosure is removed, thus exposing the individual wafers 11. The individual semiconductor wafers are now mechanically separated from one another but all retain precisely the same positions they had at the start of the separation process. These wafers are thus in a condition to be individually handled and conveyed to various locations for further processing.

In order to prevent the wafers 11 from being subjected to any disturbance due to vibrations produced by the cutting away or punching out of the welded seams 4, the enclosure 5 is placed, prior to the cutting of seams 4, on a suitable support 13, which may be of the type having an adhesive layer at its upper end or of the type which subjects the bottom surface 15 of the enclosure to a vacuum, for example. Such a support will have the effect of maintaining both the bottom surface 15 of the enclosure and the wafers stationary while the seams are being cut away and the top surface 12 is being removed.

Finally, as is shown in FIGURE 6, the exposed, mechanically separated wafers 11 may be individually removed from the bottom surface 15 of the enclosure by means of a vacuum pencil 14, such vacuum devices being well-known in the art. Since all of the individual wafers 11 retain their original respective positions, those wafers which have been marked as rejects 11' can be easily removed from the remaining wafers.

It may thus be seen that the present invention provides a simple and efficient method for separating a relatively large disc of semiconductor material into its individual semiconductor wafers, or chips, while maintaining the relative positions of all of these chips, so that they may be individually handled, and the marked rejects removed, after the wafers have been mechanically separated from one another.

It will be understood that the above description of the present invention is susceptible to various modifications, changes, and adaptations.

What is claimed is:

1. A method of separating a semiconductor disc containing a plurality of semiconductor elements into a plurality of individual wafers each containing at least one of the elements, the disc being scored along lines defining the boundaries of the individual wafers, comprising the steps of:

(a) inserting such scored disc into a flexible, substantially flat enclosure originally provided with an opening only along one edge by inserting the disc through such opening;

(b) evacuating air from such enclosure and heat sealing the open edge of the evacuated enclosure shut for causing the walls of the enclosure to bear firmly against the disc and thus to maintain the wafers in their respective relative positions when the disc has been subsequently broken apart;

(c) breaking the disc apart along its scoring lines for mechanically separating the individual wafers from one another; and (d) removing all of the edges of such enclosure and then lifting off its upper flat surface for exposing the individual semiconductor wafers while maintaining them in their respective positions.

2. A method as defined in claim 1 wherein said step of breaking the disc apart along its scoring lines is carried out by rolling a roller over such enclosure at least once in each direction perpendicular to each set of lines along which the disc is scored.

3. A method as defined in claim 2 wherein said step of breaking the disc apart is further carried out by supporting such enclosure on a rubber padding while said rolling is being carried out.

4. A method as defined in claim 1 wherein such enclosure is made of a heat-sealable plastic.

5. A method as defined in claim 4 wherein such enclosure is made of a polyester.

6. A method for separating a semiconductor disc containing a plurality of semiconductor elements into a plurality of individual wafers each containing at least one of the elements, the disc being scored along lines defining the boundaries of the individual wafers, comprising the steps of:

(a) inserting such scored disc into a flexible, substantially flat enclosure composed of a bottom surface supporting such disc and a top surface covering such disc;

(b) evacuating air from such enclosure and sealing the evacuated enclosure for causing the walls of the enclosure to bear firmly against the disc and thus to maintain the wafers in their respective relative positions when the disc has been subsequently broken apart;

(c) breaking the disc apart along its scoring lines for mechanically separating the individual wafers from one another;

(d) firmly attaching the bottom surface of such enclosure to a support; and (e) removing the top surface of such enclosure for exposing the individual semiconductor wafers while maintaining them in their respective positions.

7. A method as defined in claim 6 wherein said step of firmly attaching is carried out by gluing such bottom surface to such support.

8. A method as defined in claim 6 wherein said step of firmly attaching is carried out by subjecting such bottom surface to a vacuum.

9. A method as defined in claim 1 comprising the further step of removing each individual wafer in turn after said step of removing part of such enclosure.

References Cited

UNITED STATES PATENTS

| | | | |
|---|---|---|---|
| 3,040,489 | 6/1962 | Da Costa | 225—2 X |
| 3,321,316 | 5/1967 | De Paolis et al. | 53—22 X |

JAMES M. MEISTER, Primary Examiner

U.S. Cl. X.R.

29—583; 53—9, 21; 225—2